United States Patent
Korotkov (10) Patent No.: US 10,609,110 B2
(45) Date of Patent: Mar. 31, 2020

(54) REMOTE ACCESS OVER INTERNET USING REVERSE SESSION-ORIGINATION (RSO) TUNNEL

(71) Applicant: VMware, Inc., Palo Alto, CA (US)

(72) Inventor: Dmitry Korotkov, Union City, CA (US)

(73) Assignee: VMware, Inc., Palo Alto, CA (US)

( * ) Notice: Subject to any disclaimer, the term of this patent is extended or adjusted under 35 U.S.C. 154(b) by 326 days.

(21) Appl. No.: 14/971,872

(22) Filed: Dec. 16, 2015

(65) Prior Publication Data

US 2017/0180184 A1 Jun. 22, 2017

Related U.S. Application Data (60) Provisional application No. 62/240,075, filed on Oct. 12, 2015.

(51) Int. Cl.
*H04L 29/08* (2006.01)
*H04L 29/06* (2006.01)
*H04L 12/46* (2006.01)

(52) U.S. Cl.
CPC .......... *H04L 67/02* (2013.01); *H04L 12/4633* (2013.01); *H04L 63/0272* (2013.01); *H04L 63/0281* (2013.01)

(58) Field of Classification Search
CPC ..................................................... H04L 41/046
USPC ......................................................... 709/202
See application file for complete search history.

(56) References Cited

U.S. PATENT DOCUMENTS

| | | | |
|---|---|---|---|
| 7,545,780 B2 | 6/2009 | Chitrapu | |
| 7,979,528 B2 | 7/2011 | Eisenberg et al. | |
| 8,626,891 B2 | 1/2014 | Guru et al. | |
| 8,661,132 B2 | 2/2014 | Dorai et al. | |
| 8,782,794 B2 | 7/2014 | Ramcharran | |
| 8,875,237 B2 | 10/2014 | Engdahl et al. | |
| 9,037,980 B2 | 5/2015 | Gastaldi et al. | |
| 9,929,969 B1 | 3/2018 | Krottapalli et al. | |
| 2004/0098623 A1 | 5/2004 | Scheidell | |
| 2007/0127496 A1 | 6/2007 | Tjandra | |
| 2010/0269109 A1 | 10/2010 | Cartales | |
| 2011/0258432 A1* | 10/2011 | Rao ......................... | H04L 63/08 713/150 |
| 2012/0066375 A1 | 3/2012 | Phaal | |
| 2012/0110156 A1 | 5/2012 | Guru et al. | |
| 2013/0042123 A1 | 2/2013 | Smith et al. | |

(Continued)

*Primary Examiner* — Hermon Asres
*Assistant Examiner* — Sibte H Bukhari (57) ABSTRACT

A remote user sends a user request to a relay server that, in turn, forwards the user request (modified or unmodified) through a reverse session-origination (RSO) tunnel to an on-premises network client. In other words, while the user requests flow from outside the client network to the client network, the requests of the delivery protocol for the tunnel flow in the reverse direction, i.e., from the client network toward the relay server and/or the remote user. A server agent, executing client side, generates delivery-protocol requests so that the server can wrap user requests in delivery-protocol responses. In addition, the server agent unwraps user requests and forwards them to their intended destination in the client network. To minimize any time the server would have to wait for a delivery-protocol request, the server agent can generate dummy requests whenever no delivery-protocol request is pending at the server.

9 Claims, 4 Drawing Sheets

(56) References Cited

U.S. PATENT DOCUMENTS

| | | |
|---|---|---|
| 2014/0122430 A1 | 5/2014 | Dary |
| 2015/0009995 A1 | 1/2015 | Gross et al. |
| 2015/0172345 A1* | 6/2015 | Mantin .................. H04L 65/60 709/219 |
| 2016/0127230 A1* | 5/2016 | Cui ....................... H04W 40/02 370/389 |
| 2018/0027006 A1 | 1/2018 | Zimmermann et al. |

* cited by examiner

REMOTE ACCESS OVER INTERNET USING REVERSE SESSION-ORIGINATION (RSO) TUNNEL

BACKGROUND

Small and medium-sized businesses (SMBs) typically have on-premises computer networks connected to the Internet via a firewall. For security purposes, the firewall restricts communications between the on-premises network and the Internet at large. The firewall can then make it difficult for legitimate users to access the on-premises network remotely. Accordingly, some on-premises networks are set up to allow remote access using Virtual Private Networks (VPNs) that provide a secure channel through the firewall between the remote user and the on-premises network. Functionally, the remote device becomes part of the on-premises network.

However, it can be costly and cumbersome to set up a computer system network for VPN access. VPNs can be problematic; for example, there can be address conflicts, especially in cases in which a user connects to more than one VPN at a time. Such address conflicts can prevent a user from contacting all devices on conflicting networks. As a result, many SMBs eschew VPNs, thus narrowing their capacity for remote access and opportunities for increased productivity.

DETAILED DESCRIPTION

Herein, the challenge of remote access to an "on-premises" client network is addressed using an off-premises Internet relay server that is connected to the computer system using a reverse session-origination (RSO) tunnel. The RSO tunnel may extend through a firewall of the client network. A remote user can send a user request to the relay server. The relay server can forward the user request, modified or unmodified, through the tunnel to a destination on the client network.

Herein, a "tunnel" is a network channel in which packets of a "payload protocol" are encapsulated as payloads in packets of a "delivery protocol" in a manner not called for by an applicable Internet Protocol Suite. For example, while the Internet Protocol Suite would call for encapsulating a packet of an application layer protocol (e.g., the HyperText Transfer Protocol, abbreviated HTTP), as a payload in a transport layer protocol (e.g., Transmission Control Protocol or TCP), it would not call for encapsulating a TCP packet in an HTTP packet. Some embodiments herein employ tunnels in which TCP packets are encapsulated in HTTPS packets, where HTTPS ("HTTP Secure") is a secure variant of HTTP employing a Secure Sockets Layer (SSL) protocol or a Transport Layer Security (TLS) protocol. As is conventional, "SSL" is used herein to refer to both SSL and TLS protocols.

Although they provide for bi-directional communication between a client and a server, HTTP and HTTPS are examples of unidirectional session-origination protocols. Request-response sessions, i.e., sequences of requests and responses, are at least predominantly originated by client requests to a server. Thus, the forward direction for session origination is from client to server. The payloads, e.g., user requests and responses, may also have an associated direction of origination, which may be the same or opposite the direction of origination associated with the delivery protocol. If they are the same, the tunnel is a "forward session-origination (FSO) tunnel"; if they are opposite, the tunnel is a "reverse session-origination (RSO) tunnel". Bi-directional session-origination tunnels are neither FSO or RSO.

Herein, a remote user initiates communication sessions by issuing requests, some of which may actually be commands. The client network responds to each request, e.g., by providing requested information or indicating that a user command has been implemented. So remote user sessions originate outside the client network and are directed to the client network. In other words, the direction of session origination for the delivery protocol is the reverse of the direction of origination of the user sessions. In this sense, the tunnels herein are reverse session-origination (RSO) tunnels.

RSO tunnels face a challenge as the user is not on-premises with the client that originates the session-originating delivery protocol requests. Accordingly, a server agent can be installed on the client network to provide for user-less generation of delivery-protocol requests. The server agent can also unwrap user requests from delivery protocol responses and forward the unwrapped user requests to their intended on-premises destination. The agent can also wrap responses to user requests in delivery-protocol requests. While the agent requires installation, the effort involved is comparable to installing an application, and is much less burdensome than setting up a client network for VPNs.

A surprising additional benefit of the server agent is that it can be used to form the tunnel itself by forwarding an on-premises port to a port on the relay server. The agent can be triggered to establish a connection between itself and an agent connection endpoint (ACE) on the relay server. The ACE, which would typically be co-developed with the server agent, wraps user requests in delivery-protocol responses and unwraps user responses (to user requests) from delivery-protocol requests.

Another challenge for an RSO tunnel is that the relay server may have to wait until there is a pending delivery-protocol request before the relay server can forward a user request to the on-premises client network. This wait is in addition to any increased latency due to access being remote instead of local (i.e., from an on-premises user). So that the remote-user experience is not unduly degraded, the server agent can act to minimize the duration of intervals during which no delivery-protocol request is pending. This can involve generating and transmitting dummy requests (e.g., bearing no information to be forwarded to the user); user requests can then be wrapped into responses to the dummy requests.

In some embodiments, the relay server simply wraps a user request into a delivery-protocol response. In other embodiments, some translation of the user request as received is involved. In other embodiments, the relay server performs more complex translations. For example, a user may request hourly processor utilization reports, in which case, the relay server may schedule user requests to be sent hourly. In still other embodiments, the relay server may generate its own "user requests", that are not in response to specific requests from a remote user. For example, a relay server may provide for automated monitoring of an on-premises client network and, to that end, generate probes for specific system health information regarding the on-premises client network. In summary, the services provided by a relay server can range from simple forwarding to complex artificial intelligence systems for monitoring and maintaining one or more on-premises client networks.

For example, the relay server can be a Management-as-a-Service (MaaS) server for managing a client network. MaaS addresses problems with remote management and adds valuable additional capabilities. Remote (that is, off-premises and outside firewall 104) users connect to a MaaS site using an app or a web browser. The MaaS site can take care of authentication and authorization, prioritizing requests, and so on. In addition, a MaaS site can provide for ongoing monitoring of the on-premises network and even use artificial intelligence and other functionality to provide for automatic proactive management of the on-premises network.

Figure 1:
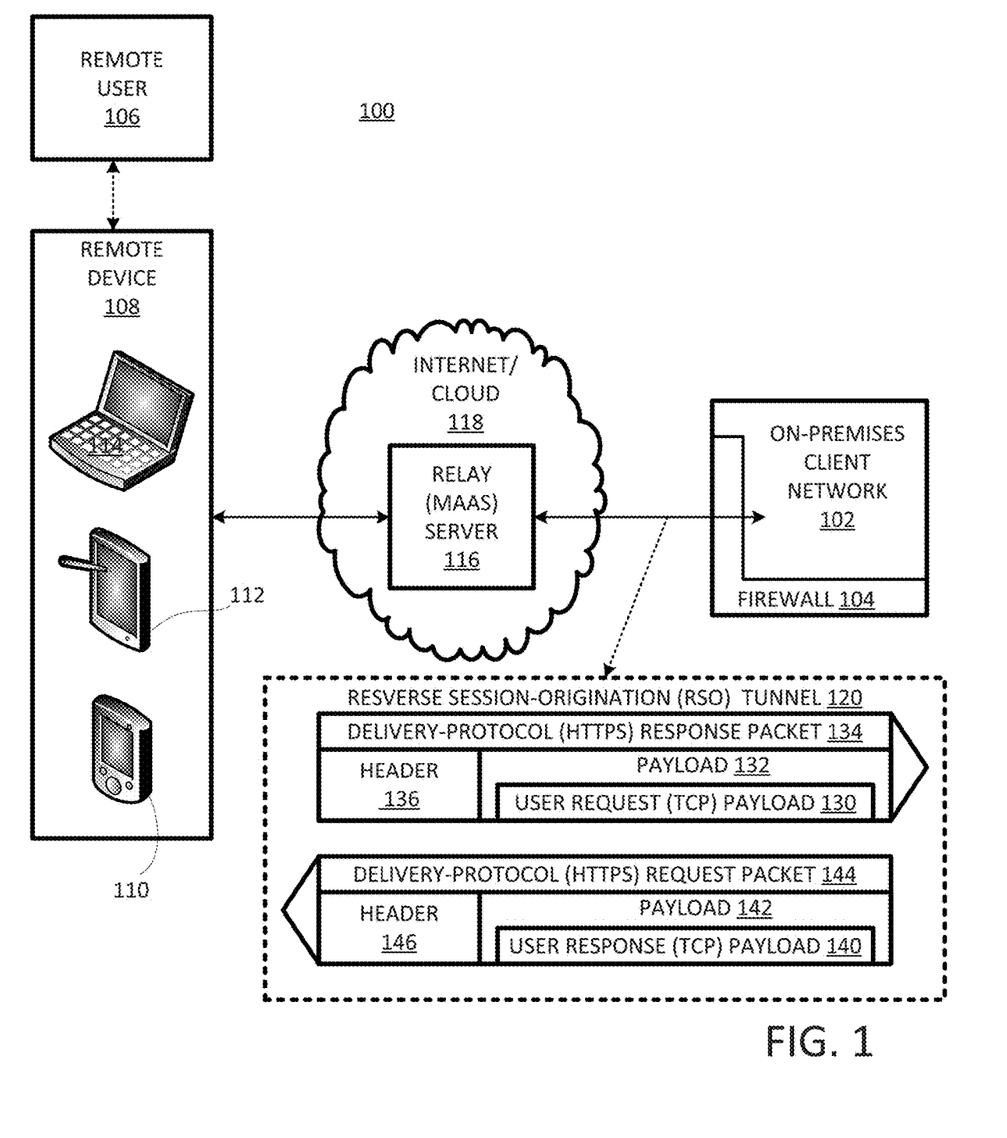
FIG. 1 is a schematic diagram of a digital environment allowing remote access to a client network using a reverse session-origination (RSO) tunnel.

For example, a digital environment 100 can include an SMB-owned on-premises client network 102, as shown in FIG. 1. Client network 102 includes a firewall 104 that allows Internet access, while protecting client network 102 from unauthorized access. A user 106, e.g., an owner or employee of the SMB, may require remote access using an app or web browser executing on a remote device 108, such as a smartphone 110, a tablet 112, or a laptop computer 114. Remote access to client network 102 is provided via an Internet-based relay server 116 located on the Internet/cloud 118 and outside firewall 104. The remote device 108 can access relay server 116 using an HTTPS protocol, a cellular protocol, or another protocol.

In various embodiments, an on-premises client network includes one or more computers. One or more of the computers may serve as a physical host for virtual machines, which may, in turn, run applications or other programs. To this end, a hypervisor or other virtual machine monitor may execute on the host hardware. In an embodiment, relay server 116 may host MaaS software for managing virtual machines executing in client network 102.

Relay server 116 accesses client network 102 via an RSO tunnel 120. User sessions may be originated by the user at a user device 108. In that case, the relay server 116 may forward the user requests (modified or unmodified) to the client network 102 via RSO tunnel 120. Alternatively, relay server 116 may generate its own remote user requests destined for client network 102.

User requests can be packetized and the user request packets can be sent over RSO tunnel 120 to client network 104. The user requests can be conveyed according to a protocol understood by the intended destination within client network 102. In the illustrated embodiment, the user protocol is the TCP/IP transport layer TCP protocol. The payloads of the user request packets may be encapsulated as payloads of delivery-protocol packets. The delivery protocol can be, for example, HTTPS. As shown in FIG. 1, a user request (TCP) packet 130 can be encapsulated as a payload 132 of a delivery-protocol packet 134 that also includes a delivery-protocol header 136 (to specify, for example, an origin, a destination and a session identifier). Upon receipt at client network 102, the user-request payload 130 is extracted, a TCP header is added, and the resulting TCP packet is transmitted to its destination within client network 102.

Similarly, a user response, generated by client network 102 in response to a user request, can be packetized into user-response packets destined for relay server 116 and/or user 106. Each user-response payload 140 can be wrapped as a payload 142 in a delivery-protocol request packet 144. In addition to the payload, the delivery-protocol request packet can include a header 146, for example, specifying an origin, a destination, and a session identifier. The delivery protocol request payload 144 is then transmitted to relay server 116 via RSO tunnel 120.

Upon receipt at server 116, the user-response payload 140 is then extracted from the delivery-protocol request packet 144, a header is added, and the resulting user-response packet is consumed at relay server 116 and/or forwarded to and consumed by user 106.

In the illustrated embodiment, the delivery-protocol packet 134 includes, as its payload, only the payload of a payload-protocol packet 130. The payload-protocol header is not included as part of the delivery-protocol payload. The source and destination are determined by the tunnel itself, so the payload-protocol header is not needed to specify them. Omitting the payload protocol header in the delivery-protocol payload avoids certain potential address conflicts.

In summary, payload-protocol user requests are wrapped in delivery-protocol responses, and payload-protocol user responses are wrapped in delivery protocol requests. The user sessions originate as transmissions toward client network 102, while the delivery protocol sessions originate as transmissions from client network 102. Hence, the characterization of tunnel 120 as reverse session origination.

Note that the terms "delivery protocol" and "payload protocol" are defined relative to each other. For example, the HTTPS delivery protocol of FIG. 1 resides at the application layer of the Internet Protocol Suite, otherwise known as "TCP/IP". The Internet Protocol Suite defines a four-layer stack including: a link layer, an Internet layer, a transport layer, and an application layer. Tunneling contributes an additional layer, resulting in the 5-layer stack of FIG. 2.

Figure 2:
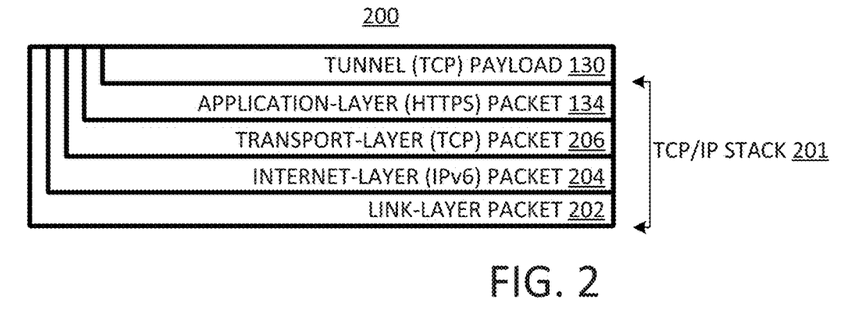
FIG. 2 is a schematic diagram showing a nested packet of the digital environment of FIG. 1.

Thus, a tunnel stack 200 can have a link-layer packet 202 encapsulating an Internet-layer (e.g., Internet Protocol Layer version 6 or IPv6) packet 204. The Internet layer packet 204 can encapsulate a transport layer 206, e.g., TCP, packet 134. The transport layer packet 206 can encapsulate an application layer, e.g., HTTPS, packet 134. The application layer HTTPS packet 134 can include as its payload the payload of a TCP packet 130. To avoid confusion, it can be helpful to keep in mind that the tunnel TCP payload 130 is distinct from the transport-layer packet 206, despite the fact that they both may conform to the TCP protocol.

As explained above, a user request packet is encapsulated in a delivery-protocol response packet. However, the delivery-protocol response must refer to a previously generated delivery protocol request or to a session originated by a previously generated delivery-protocol request. In other words, a user request cannot be sent to the network client 102 (FIG. 1) until relay server 116 has received a corresponding delivery-protocol request. As a result, transmission of a user request can be delayed by the time spent waiting for a delivery-protocol request to be received from client network 102. By ensuring a practically continuous presence of a delivery-protocol request packet, RSO tunnel 120 minimizes this delay to near zero.

Figure 3:
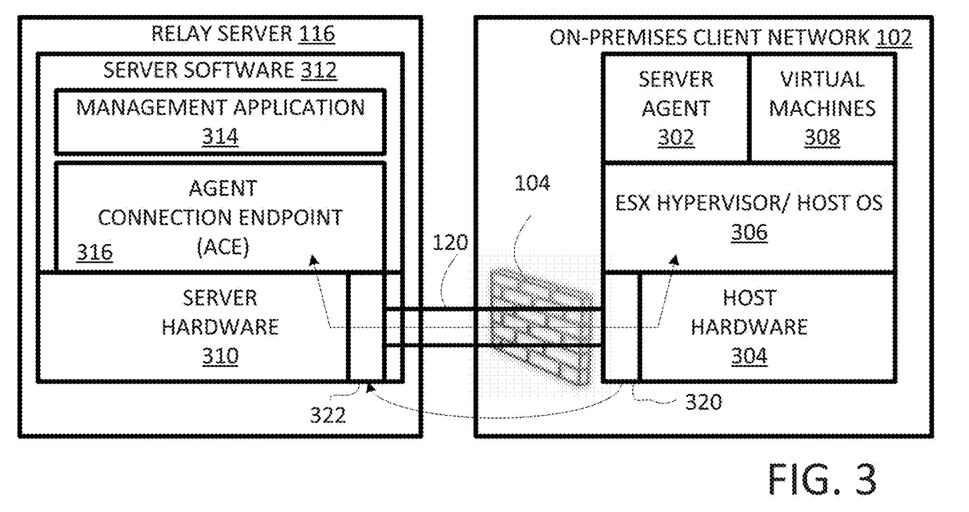
FIG. 3 is a schematic diagram of a relay server and a client network connected by the tunnel of FIG. 1.

To provide the prerequisite requests, a server agent 302, shown in FIG. 3, is installed on client network 102. As shown in FIG. 3, client network 102 includes host hardware 304, a hypervisor 306 running on hardware 304, and virtual machines 308 running on hypervisor 306. Hypervisor 306 can be, for example, ESX, available from VMware, Inc. Server agent 302 runs on hypervisor 306. In other embodiments, the server agent can run on a host operating system that is separate from the hypervisor or on a hypervisor that is separate from a host OS, or elsewhere3. Depending on the embodiment, a server agent and the virtual machines it helps in managing may run on the same on-premises physical host and/or on different on-premises physical hosts.

Relay server 116 includes server hardware 310 and server software 312. Software 312 is software encoded in media included in server hardware 310. In the illustrated embodiment, server software 312 includes a management application 314 to provide management as a service (MaaS), and an agent connection point (ACE) 316. Management application 314 is used to manage virtual machines 308 via hypervisor 306. Hypervisor 306 can acknowledge that management commands have been implemented and can provide status information regarding virtual machines 308 in response to user requests therefor.

Server agent 302 can create RSO tunnel 120 by forwarding a client-side port 320 of client network 102 to a server-side port 322 of server 116. Server agent 302 can packetize, encrypt, wrap, and transmit user-response packets from hypervisor 306; this is one way to generate the request packets needed to transport user requests to client network 102. Server agent 302 can also unwrap, decrypt, and forward to hypervisor 306, user requests. Server agent 302 can also generate dummy packets to minimize the amount of time in which no delivery-protocol request is pending and to minimize the time a user request must wait before being wrapped and transmitted to client network 102.

Figure 4:
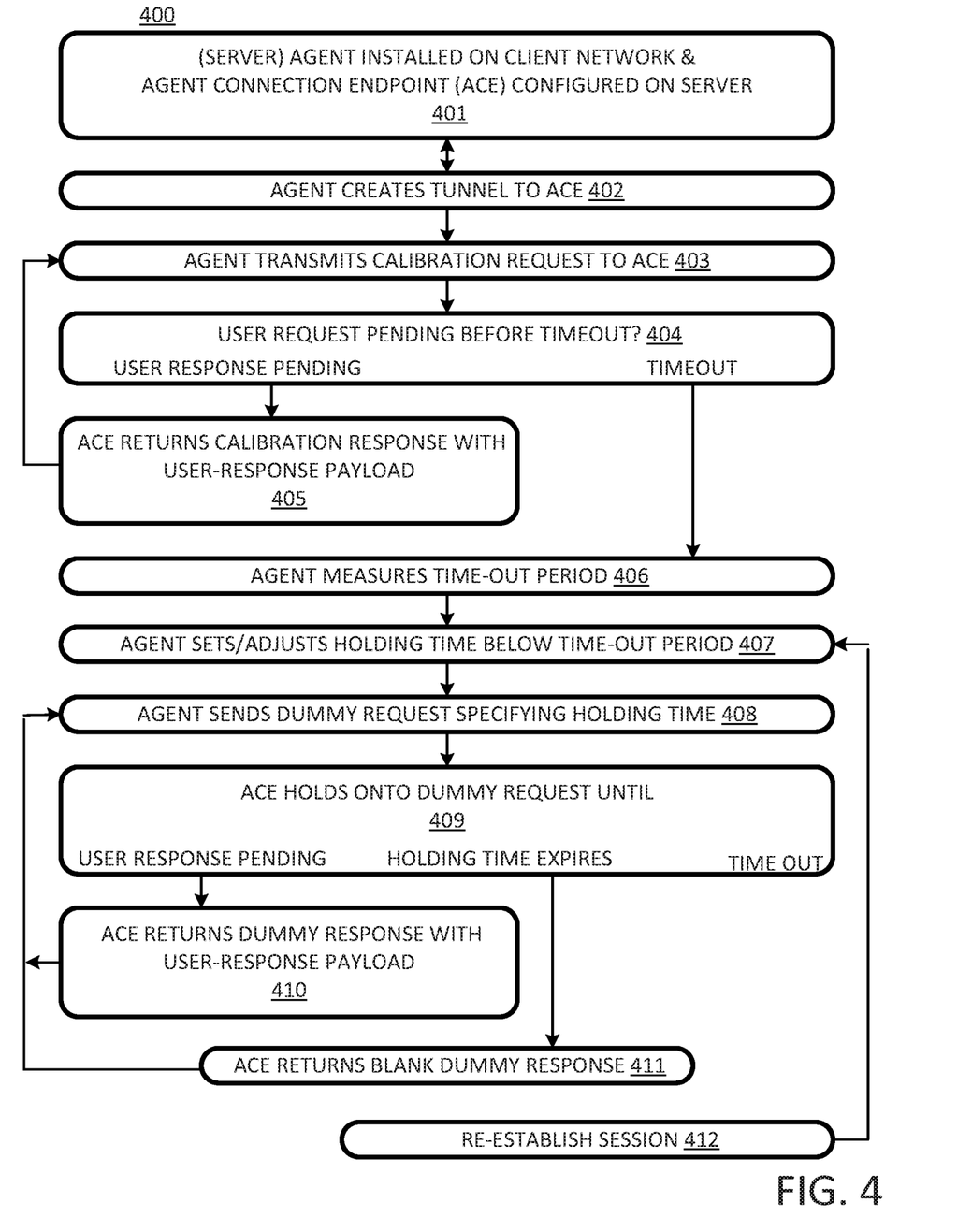
FIG. 4 is a flow chart of a process for setting up an RSO tunnel such as the RSO tunnel of FIG. 1.

Accordingly, a process 400, flow-charted in FIG. 4, provides for setting up an RSO tunnel so that a protected client network can receive user requests over the Internet. At 401, a server agent is installed on the client network, and an agent connection endpoint (ACE) can be configured on a server. The server can be Internet-based, e.g., outside a firewall for the client network. Note that the configuration of the ACE may occur before, after, or concurrently with installation of the server agent at 401.

At 402, the server agent forwards a port to the server to establish a tunnel. This allows the Internet-based server to connect to a specific service on the private client network. The forwarded port can be web-services (HTTP) port 80; this port can be forwarded to a port of the server associated with the ACE. The host for the forwarded port can then act as an HTTP server, while the ACE can function as its client. Thus, for the resulting tunnel, sessions originate at the network client and are directed from the network client to the server.

The tunnel has an associated payload protocol, in this case TCP, and an associated TCP/IP application-layer delivery-protocol, in this case HTTPS. In other embodiments, other payload protocols and other application-layer delivery protocols are used. In some embodiments, the payload protocol and the delivery protocol are the same; for example, they can both be HTTP or HTTPS.

At 403, the server agent transmits a calibration request to the ACE. The calibration request can be a dummy request. At 404, a determination is made whether a user request is pending (at the ACE) before the calibration request times out. If a user request is pending, either because it was received before the calibration request is received, or because it is received as or after the calibration request is received but before time out, then, at 405, the ACE returns a calibration response with the user request as payload to the server agent. At this point, process 400 returns to action 403, with the server agent transmitting a new calibration request.

If instead, at 404, the calibration request times out, the ACE will notify the server agent of the timeout; the time out may result from the operation of various underlying systems. At 406, the server agent measures the "time-out period", i.e., the time between calibration-request transmission and detection of the time-out. A request-response session can be terminated by a time-out, e.g., imposed by an Internet Service Provider (ISP), a firewall (if any), or an HTTP proxy (if any). If a session is terminated, it can be re-established using a handshake process that consumes plenty of processor cycles, and requires multiple packet round-trips. As a result, bandwidth consumption and latency increase. The server agent has no reliable means of knowing the time-out period a priori; hence the measurement.

At 407, the server agent sets a "holding time" for the ACE to hold a dummy request before responding to it. The goal is to ensure practically continuous pendency of dummy requests while minimizing the amount of tunnel bandwidth consumed by the dummy requests and the responses thereto. Longer holding times mean fewer dummy requests per unit time, but risk interruptions due to time outs. Shorter holding times reduce the risk of time outs, but increase tunnel traffic. For example, the response-time limit can be set as a percentage (e.g., 90%) of the time-out period. In the illustrated embodiment, holding times are usually between 10 seconds and 10 minutes.

At 408, the server agent sends a dummy request, specifying the holding time, to the ACE. At 409, the ACE holds onto the dummy request until: 1) there is a user request pending, 2) the holding time expires, or 3) there is a time out. If there is a user request pending, the ACE returns a dummy response with the user request as its payload at action 410. If the user request is pending when the ACE receives the dummy request, the response is as immediate as possible. If the user request is received during the holding time, the dummy response is sent as soon as possible after receipt of the user request. If the holding time expires without receipt of a user response, at 411, the ACE returns a blank (no user request in the payload) response to the server agent. Whether or not the dummy response includes a user request, process 400 returns to action 408 immediately to minimize any time a subsequent user request must wait before being forwarded to the client network.

The other possibility is that the dummy request will time out before a user request is received and before the holding time expires. In that case, a session must be re-established at 412. Once the session is re-established, the server agent can adjust, at 407, the holding time downward to reduce the likelihood of interruption due to time outs.

Figure 5:
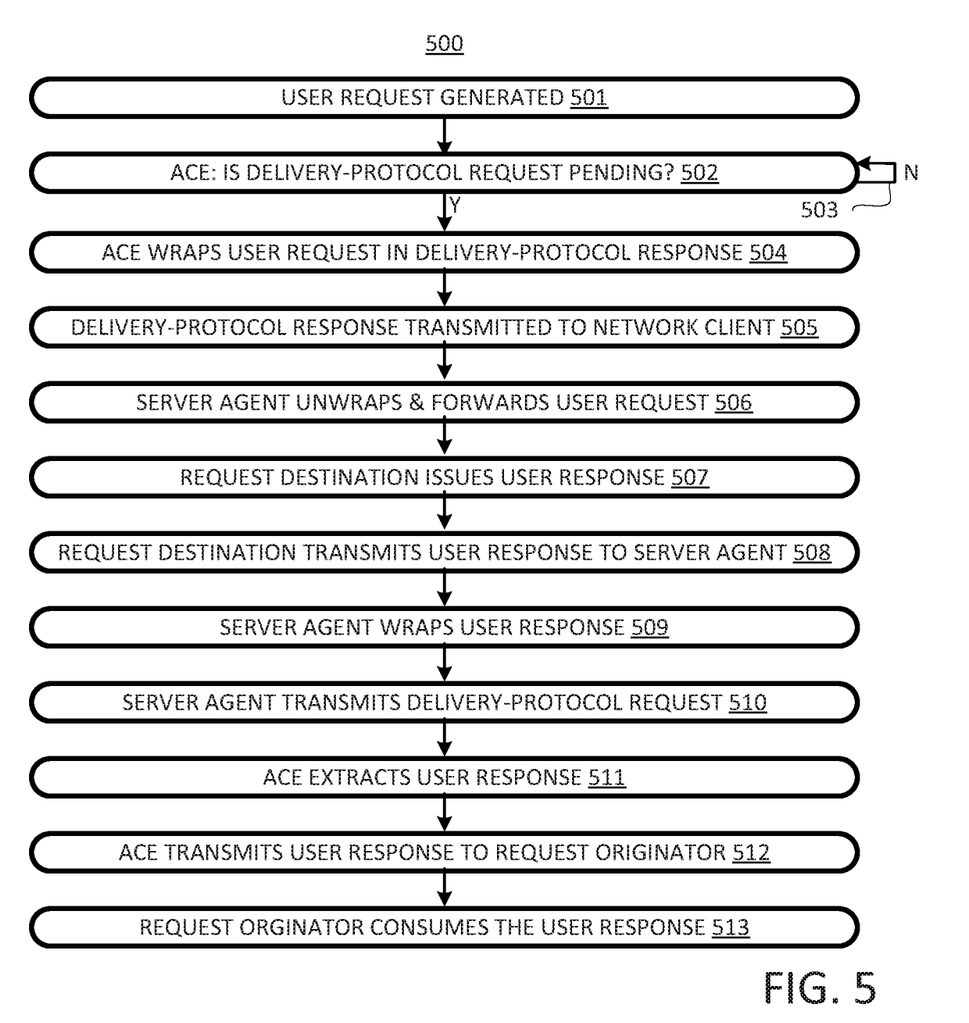
FIG. 5 is a flow chart of a process for handling a user request using the RSO tunnel of FIG. 1.

Process 400 is designed to optimize the user experience by minimizing any delay associated with remote (vs. local) access via a tunnel of a client network. The handling of a session initiated by a remote user is represented in FIG. 5 as process 500.

At 501, a user request is generated (asynchronously and independently of delivery-protocol request generation). For example, a user can interact with an app or web browser on a user device to generate a request and transmit it to the server. The server may forward the user requests "as is" or modify them before sending them on. "Modifying" can include translating from one format to the other, scheduling a series of modified user requests in response to a single user request, and other modifications, e.g., by a management or other application executing on the server.

At 502, the ACE determines whether or not a delivery-protocol request is pending locally. If not, the ACE waits before proceeding to action 504, as indicated by the loop-back arrow 503. Process 400 ensures this wait is brief. Once a delivery-protocol request is pending, then, at 504, the ACE wraps the user request in a delivery-protocol response to the pending delivery-protocol request. As suggested earlier, this can wrapping user request packet payloads as payloads in delivery-protocol packets.

The user request can be packetized and included as payloads in delivery-protocol response packets that identify the client network port as a destination and identify a session associated with a prior delivery-protocol request. The delivery-protocol packets can be encrypted, e.g., according to an applicable transport-layer security (TLS, SSL) protocol. At 505, the delivery-protocol response (encapsulating user requests) is transmitted through the RSO tunnel to the network client.

At 506, the server agent unwraps the user request and forwards it to their intended destination, e.g., a hypervisor, on the client network. This can involve decrypting the payload and appending a header to form a complete TCP packet. The header can specify the TCP packet destination as the destination is fixed and known by the server agent. The header can specify the source of the encapsulating HTTPS packet as the source for the TCP use-request packet. The intended destination may respond, e.g., by turning a virtual machine on or off as called for by the user request.

At 507, the destination, e.g., the hypervisor, can issue a user response (that is, a response to a user request) in the same protocol as the user request. The user response may indicate that the destination that the user request has (or has not) been fulfilled; also the user response may include information called for by the user request. The destination can transmit the user response to the server agent at 508.

At 509, the server agent wraps the user response in a delivery-protocol request. This wrapping can involve stripping the header from TCP packets and encrypting the payload. At 510, the server agent transmits the delivery-protocol request (that encapsulates the user response) to the ACE on the server.

At 511, the ACE extracts (unwraps) the user response from the delivery-protocol request. This can involve generating a header appending it to the TCP payload. At 512, the ACE transmits the user response to the request originator, e.g., to its destination on the server. At 513, the request originator (the sserver or user device) consumes the user response. In other words, the server consumes and/or forwards (to the user via a user device) the user response. Depending on the scenario, a session can have additional round-trip request-response transactions.

Herein, an "application programming interface" (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising the interface. An API port is a communications node for communication with an associated application or protocol. In the illustrated embodiment, the port to be forwarded has the number 80, which is conventionally assigned to the HTTP protocol.

In general, an API port can have a numerical identifier and can be addressed by combining an IP address for the application host with the port number for the application itself. A command line string or other technique can be used to forward one port, e.g., the HTTP port on a physical host of the client network, to another, e.g., the port associated with the ACE on the Internet-based server. The result is a tunnel having a delivery protocol such as HTTP or HTTPS.

Herein, a "tunnel" is a communications channel of a network that includes a hardware layer and encapsulates packets or portions thereof conforming to a first "payload" protocol within packets conforming to a second "delivery" protocol compatible with the network. Herein, the delivery protocol is a TCP/IP application-layer protocol. Herein, "wrapping a request" and "wrapping a response" imply the wrapping may be performed on a packet-by-packet basis.

The Internet Protocol Suite (also known as TCP/IP) specifies how information is conveyed over the Internet and similar networks. More specifically, TCP/IP provides end-to-end connectivity specifying how data should be packetized, addressed, transmitted, routed and received at the destination. This functionality is organized into four abstraction layers which are used to sort all related protocols according to the scope of networking involved. From lowest to highest, the layers are: the link layer, containing communication technologies for a single network segment (link); the internet layer, connecting hosts across independent networks, thus establishing internetworking; the transport layer handling host-to-host communication; and the application layer, which provides process-to-process application data exchange and maintains sessions. Application-layer packets are encapsulated as payloads in transport-layer packets, which are encapsulated as payloads in internet-layer packets, which are encapsulated as payloads in link-layer packets.

Depending on the embodiment, the client network can include one or more physical servers or other computers. The computers of a client network may be arranged in a local-area network (LAN) or a wide-area network (WAN). The client network may include wireless networking or wired networking or both. Physical servers may host virtual machines supported by various virtualization technologies.

The relay server may be a simple forwarding service for remote user requests or may include an application that responds in simple or complex ways to user requests, generating its own user requests in response to remote user requests or acting autonomously. The relay server may support MaaS or other software-as-a-service (SaaS) applications. The payload protocol for the RSO tunnel will depend on the protocol expected by the payload destination on the client network. The relay server may include a standalone or other hardware computer, a network of servers operating as a single server, or a partition of a physical server, and/or virtual machines running on any of the above.

These and other variations upon and modifications to the illustrated embodiment are provided for by the present invention, the scope of which is defined by the following claims.

What is claimed is:

1. A system comprising media encoded with code that, when executed using hardware, implements a process including:
   receiving or generating, by a server, a user request, said server including a management application to provide management as a service (MaaS);
   determining whether or not there is a delivery-protocol request from a client network pending at the server;
   utilizing a calibration response to determine a time-out period;

in the event it is determined that there is no pending delivery-protocol request from the client network at the server, repeating the determining until there is a pending delivery-protocol request from the client network at the server, and in the event it is determined that there is a pending delivery-protocol request from the client network, wrapping the user request in a delivery-protocol response, transmitting the delivery-protocol response to the on-premises network client over a reverse session-origination (RSO) tunnel, and extracting the user request packet from the delivery-protocol response at the client network, the pending delivery-protocol request being separate from the user request;

a server agent running on the client network determining whether or not a delivery-protocol request from the client network is pending at the server; and in response to a determination that no delivery-protocol request from the on-premises client network is pending at the server, transmitting a delivery-protocol request from the on-premises client network to the server prior to an expiration of said time-out period in order to prevent termination of a session.

2. The system of claim 1 wherein the process further includes the server agent causing a port on the on-premises client network to be forwarded to the server so as to create the RSO tunnel.

3. The system of claim 2 wherein a management application executing on the server generates inbound user requests from which the user request packet is derived, wherein the user request packet is used in managing virtual machines executing on hardware of the client network.

4. The system of claim 3 wherein the delivery protocol is the hypertext transfer protocol (HTTP) or a secure variant thereof, and the user request conforms to a transmission control protocol (TCP).

5. The system of claim 4 wherein the process further includes receiving, by the server and from a user device, virtual-machine management commands, user requests being generated in response to receipt of the virtual-machine management commands.

6. The system of claim 1 further comprising the hardware.

7. A system comprising:
an on-premise client network including hardware, a firewall, and a server agent located behind the firewall; and
a service including server hardware, an agent connection endpoint (ACE) located other than behind the firewall, and a server application executing on the server hardware;
the server agent being configured for
forwarding a client port of the client network to a server port of the server to form a reverse session-origination (RSO) tunnel through the firewall and from the on-premises client system to the server,
wrapping payload-protocol responses in delivery-protocol requests and transmitting the wrapped payload-protocol responses to the server via the RSO tunnel, and
extracting payload-protocol requests from delivery-protocol responses and forwarding the unwrapped payload-protocol requests to a destination on the client network;
the ACE being configured for
wrapping payload-protocol requests in delivery-protocol responses, and extracting payload-protocol responses from delivery-protocol requests, and
wherein the ACE is further configured for:
determining whether or not there is a delivery-protocol request from the on-premises client network pending at the server;
in the event it is determined that there is no pending delivery-protocol request from the client network pending at the server, repeating the determining until there is a pending delivery-protocol request from the client network at the server;
utilizing a calibration response to determine a time-out period; and
in the event it is determined that there is a delivery-protocol request from the client network at the server, wrapping a user request in an delivery-protocol response to the delivery-protocol request, transmitting the delivery-protocol response to the client network, and extracting the user request from the delivery-protocol response at the client network prior to an expiration of said time-out period in order to prevent termination of a session.

8. The system of claim 7 wherein the server agent is further configured to:
determine whether or not a delivery-protocol request from the client network is pending at the server; and
in response to a determination that no delivery-protocol request from the client network is pending at the server, transmitting a delivery-protocol request from the client network to the server.

9. The system of claim 8 wherein the first protocol is a Transmission Control Protocol (TCP) and the delivery-protocol is a secure Hypertext Transfer Protocol.

* * * * *